(12) United States Patent
Nakayama

(10) Patent No.: US 9,803,968 B2
(45) Date of Patent: Oct. 31, 2017

(54) ROUNDNESS MEASUREMENT DEVICE AND CONTROL METHOD

(71) Applicant: MITUTOYO CORPORATION, Kanagawa (JP)

(72) Inventor: Tatsuki Nakayama, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 183 days.

(21) Appl. No.: 14/847,181

(22) Filed: Sep. 8, 2015

(65) Prior Publication Data

US 2016/0084631 A1    Mar. 24, 2016

(30) Foreign Application Priority Data

Sep. 24, 2014 (JP) ................. 2014-193716

(51) Int. Cl.
*G01B 5/20* (2006.01)
(52) U.S. Cl.
CPC .................... *G01B 5/201* (2013.01)
(58) Field of Classification Search
CPC ...... G01B 5/201; G01B 5/008; G01B 21/045; G01B 21/042; G01B 5/08; G01B 5/20
USPC .......................................................... 33/550
See application file for complete search history.

(56) References Cited

U.S. PATENT DOCUMENTS

| | | | |
|---|---|---|---|
| 7,636,646 B2* | 12/2009 | Kojima | G01B 5/201 33/503 |
| 8,336,223 B2* | 12/2012 | Nakayama | G01B 21/047 33/503 |
| 8,701,301 B2 | 4/2014 | Nakayama et al. | |
| 8,915,124 B2 | 12/2014 | Nakayama | |
| 8,949,071 B2* | 2/2015 | Takanashi | G01B 5/201 33/502 |
| 9,091,521 B2 | 7/2015 | Nakayama et al. | |
| 2001/0008047 A1* | 7/2001 | Okada | G01B 5/008 33/503 |
| 2004/0168332 A1* | 9/2004 | Hama | G01B 5/28 33/551 |
| 2004/0200085 A1* | 10/2004 | Sakata | G01B 7/282 33/550 |
| 2005/0132591 A1* | 6/2005 | Kojima | G01B 5/08 33/503 |

(Continued)

FOREIGN PATENT DOCUMENTS

JP     H05-133701 A     5/1993

*Primary Examiner* — Yaritza Guadalupe-McCall
(74) *Attorney, Agent, or Firm* — Greenblum & Bernstein, P.L.C.

(57) ABSTRACT

A roundness measurement device provides a rotation table on a base and measures roundness of a measured object placed on the rotation table while rotating the rotation table, and includes a detecting main body, a detecting device driving mechanism, a stylus, a contact member, and a control device. The detecting device driving mechanism displaces the detecting device main body with respect to the base. The stylus has a base end rotatably supported on the detecting device main body and can change an angle position with respect to the detecting device main body using an external force. The contact member is provided at a position where the stylus comes in contact due to displacement of the detecting device main body by the detecting device driving mechanism. The control device controls driving of the detecting device driving mechanism.

17 Claims, 10 Drawing Sheets

(56) References Cited

U.S. PATENT DOCUMENTS

| | | | | |
|---|---|---|---|---|
| 2006/0085995 A1* | 4/2006 | Katamachi | ............ | G01B 5/0016 33/550 |
| 2009/0300930 A1* | 12/2009 | Ishikawa | .................. | G01B 5/28 33/559 |
| 2010/0292946 A1* | 11/2010 | Tamai | .................. | G01B 21/042 33/502 |
| 2010/0293800 A1* | 11/2010 | Nakayama | ............ | G01B 21/047 33/558 |
| 2011/0005095 A1* | 1/2011 | Nakayama | .............. | G01B 3/008 33/556 |
| 2011/0083335 A1* | 4/2011 | Yasuno | .................... | G01B 3/22 33/556 |
| 2011/0088273 A1* | 4/2011 | Yamamoto | ............. | G01B 3/008 33/561 |
| 2013/0133409 A1* | 5/2013 | Nakayama | ............. | G01B 3/008 73/104 |
| 2016/0084631 A1* | 3/2016 | Nakayama | ............. | G01B 5/201 33/550 |
| 2016/0161239 A1* | 6/2016 | Takanashi | .............. | G01B 5/201 33/551 |

\* cited by examiner

ROUNDNESS MEASUREMENT DEVICE AND CONTROL METHOD

CROSS-REFERENCE TO RELATED APPLICATIONS

The present application claims priority under 35 U.S.C. §119 of Japanese Application No. 2014-193716, filed on Sep. 24, 2014, the disclosure of which is expressly incorporated by reference herein in its entirety.

BACKGROUND OF THE INVENTION

1. Field of the Invention

The present invention relates to a roundness measurement device and a method for controlling the roundness measurement device. Specifically, the present invention relates to a roundness measurement device capable of automatically changing an angle position of a stylus, and to a method for controlling the roundness measurement device.

2. Description of Related Art

A roundness measurement device is a known example of a measuring device measuring roundness of a measured object. The roundness measurement device includes a base, a rotation table on which a measured object is placed and which is rotatably provided on the base, a rotational driving mechanism driving the rotation table, a column standing upright on the base, a lifting slider provided to be capable of rising and lowering in a vertical direction along the column, a slide arm provided to the lifting slider so as to be capable of sliding toward a direction orthogonal to a vertical axis, and a detection device that outputs, as an electric signal, a displacement of a stylus which is attached to a forefront end of the slide arm and contacts the measured object.

In the conventional roundness measurement device, when measuring outer/inner circumferential surfaces, a stylus has been supported inclined with respect to a detecting device main body, such that the detecting device main body does not interfere with a work piece (for example, see Japanese Patent Laid-open Publication No. H05-133701). When measuring an inner circumferential surface, especially when measuring an inner circumferential surface of a small diameter hole, a stylus or a detecting device main body interferes with an edge of the hole when the stylus is inclined. Therefore, when measuring the inner circumferential surface, the stylus has been introduced into the hole of the measured object after orienting the stylus vertically.

However, a task of switching the stylus between an inclined state and a vertical state has been conventionally carried out manually by an operator, and thus working performance could not be improved. For example, among a series of measuring operations with respect to the work piece, in a case including measurements of both the outer circumferential surface in which the stylus is inclined and the inner circumferential surface of a small hole in which the stylus is vertical, manual labor to switch the inclination in the middle of operation is required. Therefore, even though a series of measuring operations is automatically carried out, a process was required to stop the automatic operation in the middle of operation and wait for the manipulation by the operator, thus preventing total automation and work efficiency. Furthermore, the stylus can be connected to the motor and the inclination of the stylus can be changed by driving the motor, for example. However, in such a case, the configuration becomes complicated and heat generation of the motor becomes an issue. Thermal expansion caused by the heat generation of the motor may cause a measurement error.

SUMMARY OF THE INVENTION

In view of the above, the present invention provides a roundness measurement device which is capable of automatic changing of an angle position of a stylus using a simple configuration and a method for controlling the roundness measurement device.

The roundness measurement device of the present invention provides a rotation table on a base and measures the roundness of a measured object placed on the rotation table while rotating the rotation table. The roundness measurement device includes a detecting device main body, a displacement mechanism (displacer), a stylus, a contact member (contacter), and a driving controller. The displacement mechanism displaces the detecting device main body with respect to the base. The stylus has a base end rotatably supported on the detecting device main body and is capable of changing an angle position with respect to the detecting device main body using an external force. The contact member is provided so as to be incapable of relative displacement with respect to the base and is capable of contact with the stylus. The driving controller controls driving of the displacement mechanism.

In the present invention, the roundness measurement device measures the roundness of the measured object while rotating the rotation table. More specifically, the detecting device main body is displaced by the displacement mechanism, and the roundness is measured using fluctuation of a circumferential surface of the measured object while rotating by bringing the stylus into contact with the circumferential surface, which is a measurement portion of the measured object. The smaller the fluctuation of the circumferential surface is, the greater the roundness of the measured object is. The measurement portion of the measured object can be an outer circumferential surface (axis) and an inner circumferential surface (hole). When measuring the roundness in a case where the outer circumferential surface of the measured object is a long vertical plane, the stylus needs to be inclined to avoid the detecting device main body interfering with the measured object. On the other hand, when measuring the roundness in a case where a small diameter hole extending in an axis direction is formed in the center of the measured object, the stylus needs to be vertical to avoid the detecting device main body and the stylus interfering with an edge of the hole. Thus, the angle position of the stylus is preferably switched based on the measurement portion of the measured object is the outer circumferential surface or the inner circumferential surface. When the measurement portion of the measured object is either the outer circumferential surface or the inner circumferential surface, the angle of the stylus can be adjusted in advance. However, the measurement portion of the measured object can be both the outer circumferential surface and the inner circumferential surface. In such a case, conventionally, at the time measurement of a circumferential surface is completed, the other circumferential surface measurement has been performed after switching the angle position of the stylus by temporarily interrupting the measurement.

According to the present invention, the roundness measurement device includes the stylus capable of changing the angle position with respect to the detecting device main body using the external force and the contact member capable of being in contact with the stylus. Therefore, the angle position of the stylus with respect to the detecting device main body can be changed by bringing the stylus into contact with the contact member. In other words, with driving power of the displacement mechanism, automatically switching of the stylus between the inclined state and the vertical state is possible. Therefore, with a simple configuration, the angle position of the stylus can be changed without interrupting the automatic operation. In addition, since the displacement mechanism is a mechanism originally provided to the roundness measurement device for measuring, there is no need to provide another mechanism only for driving the stylus. Thereby, costs and weight can be reduced and measurement accuracy can be maintained by avoiding an influence of thermal expansion since the number of motors which are a source of heat generation is not increased.

In the roundness measurement device according to the present invention, an angle position acquirer obtaining the angle position of the stylus is preferably further provided. According to the present invention, the angle position of the stylus is obtained by the angle position acquirer. Therefore, the switch can be confirmed when switching the angle position of the stylus. In other words, switching of the angle position of the stylus can be accurately performed and, by continuing displacement using the displacement mechanism after switching is completed, an excessive external force to the stylus can be prevented.

In the roundness measurement device according to the present invention, the contact member is preferably formed in a projecting shape with respect to an installation surface. According to the present invention, since the contact member is formed in the projecting shape with respect to the installation surface, the stylus is displaced to be in front of the contact member and is made to continue on the path to contact the contact member. Therefore, changing the angle position of the stylus can be performed easily. In addition, cutting work is required when an indentation is formed on a flat surface; however, fixation of a separate member suffices when a projecting portion is formed. Therefore, the contact member in the projecting shape can be easily installed while exploring an appropriate position.

In the roundness measurement device according to the present invention, the contact member is preferably attachably/detachably provided. According to the present invention, since the contact member is attachably/detachably provided, even when the contact member is worn down and deteriorated by repeated contact against the stylus, only the contact member needs to be replaced and maintenance cost can be reduced.

In the roundness measurement device according to the present invention, the contact member is preferably configured to be capable of selectively mounting to one of a plurality of positions. According to the present invention, the mounting position of the contact member can be selected. In other words, the optimal mounting position of the contact member can be selected in response to the type and measured surface of the measured object. Thereby, a displacement distance of the displacement mechanism for changing the angle position of the stylus can be reduced and the angle position of the stylus can be changed more quickly.

In the roundness measurement device according to the present invention, the contact member is preferably covered with a cushioning material. According to the present invention, since the contact member is covered with the cushioning material, damage to the stylus at the time of contact is small. Thereby, a replacement cycle of the stylus can be extended.

A method for controlling the roundness measurement device of the present invention measures the roundness of the measured object placed on the rotation table while rotating the rotation table, the rotation table being provided on the base. The method utilizes the roundness measurement device including the detecting device main body, the displacement mechanism, the stylus, the contact member, and the driving controller. The displacement mechanism displaces the detecting device main body with respect to the base. The stylus has the base end rotatably supported on the detecting device main body and is capable of changing the angle position with respect to the detecting device main body using an external force. The contact member is provided to a position where the stylus can be brought into contact by displacement of the detecting device main body using the displacement mechanism. The driving controller controls driving of the displacement mechanism. The method includes displacing the stylus to be close to the contact member; and bringing the stylus into contact with the contact member and rotating the stylus to a predetermined angle with respect to the detecting device main body.

In the method for controlling the roundness measurement device according to the present invention, switching the measurement surface from the outer circumferential surface to the inner circumferential surface (or the reverse) while measuring roundness is performed as below. First, the stylus is displaced from the measured object to be close to the contact member by the displacement mechanism, then the stylus is rotated to the predetermined angle with respect to the detecting device main body by bringing the stylus into contact with the contact member, and finally the rotated stylus is displaced back to the measured object. By performing this process, the stylus comes closer to the contact member and the angle position of the stylus with respect to the detecting device main body can be changed. Therefore, during a series of measuring operations, the angle position of the stylus with respect to the detecting device main body can be changed without interrupting the automatic operation. Moreover, in the method for controlling the roundness measurement device according to the present invention, the method may control, at the time of roundness measurement, displacing the stylus from the measured object to be close to the contact member, rotating the stylus to a predetermined angle with respect to the detecting device main body by bringing the stylus into contact with the contact member, and displacing the rotated stylus back to the measured object.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Explanation of Roundness Measurement Device

Figure 1:
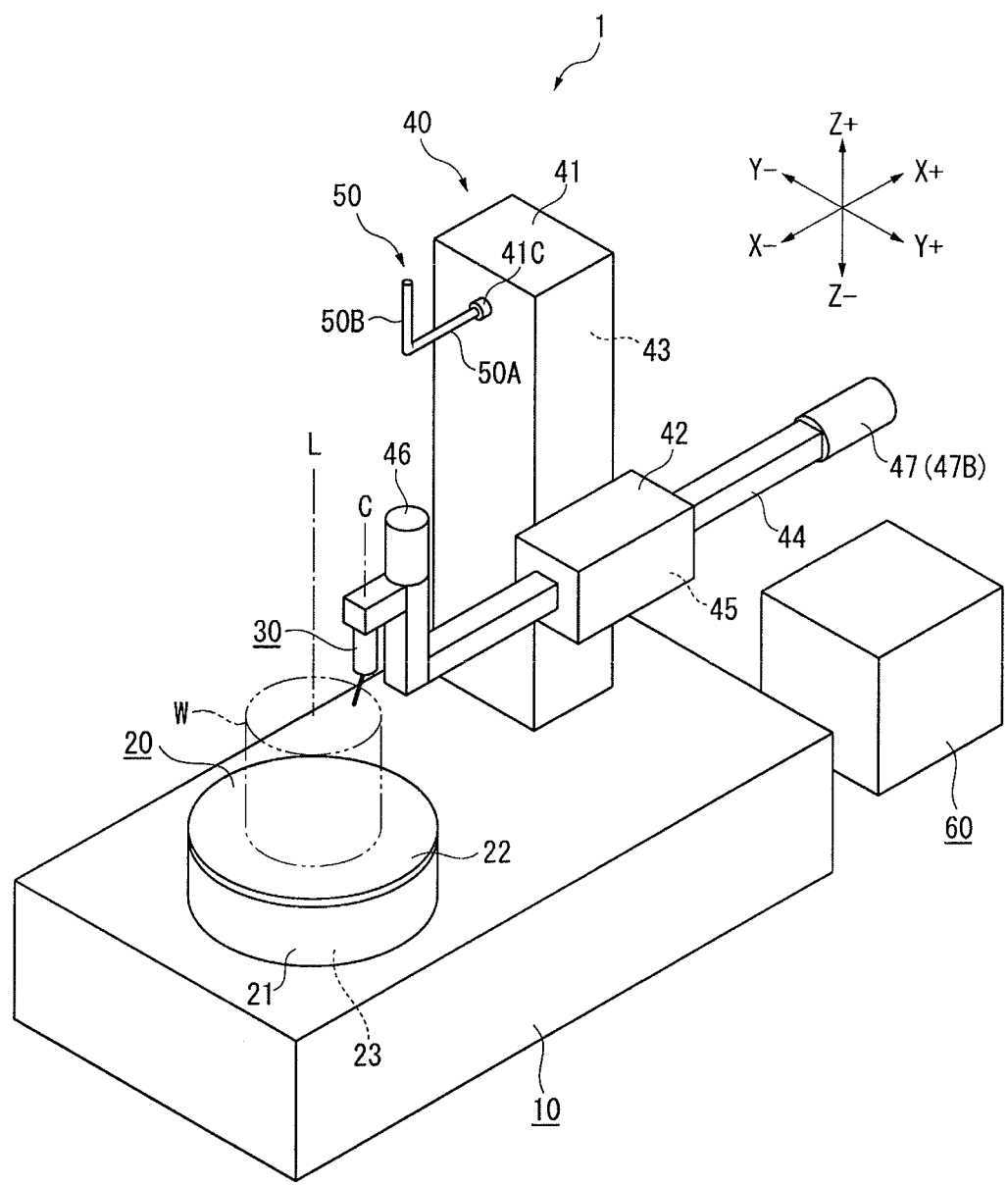
FIG. 1 is a perspective view illustrating a roundness measurement device according to an embodiment of the present invention.
Figure 2:
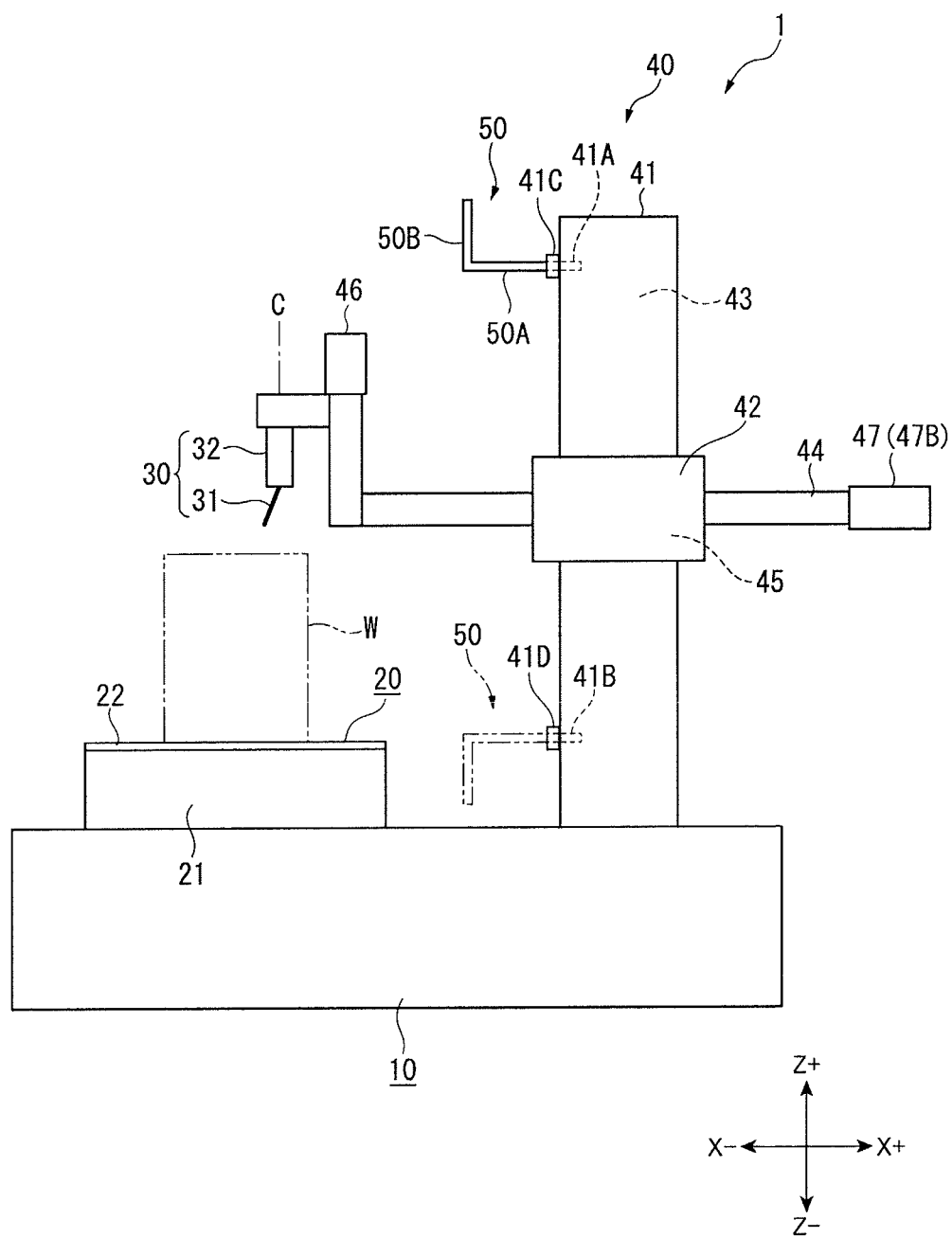
FIG. 2 is a side view of the roundness measurement device.

As shown in FIGS. 1 and 2, a roundness measurement device 1 of the present embodiment includes a base 10, a rotation table 20, a detecting device 30, a detecting device driving mechanism 40, a contact member 50, and a control mechanism 60. The rotation table 20 is rotatably provided centered on a vertical axis L on one side of the base 10 (left side in FIG. 2) and a measured object W is placed on a top surface of the rotation table 20. The detecting device driving mechanism 40 drives the detecting device 30 in a direction parallel to the vertical axis L and in a direction perpendicular to the vertical axis L and approaching/separating with respect to the rotation table 20.

The rotation table 20 is configured to be rotation driven by a rotation driving mechanism 23 and includes a cylindrical main body 21 rotatably provided on the base 10 and a disc-shaped mounting board 22, on a top surface which the measured object W is placed, provided on an upper portion of the main body 21. The rotation driving mechanism 23 includes a motor rotationally driving the rotation table 20 and a mechanism transferring rotation from the motor to the rotation table 20 via a speed reducer.

Figure 3:
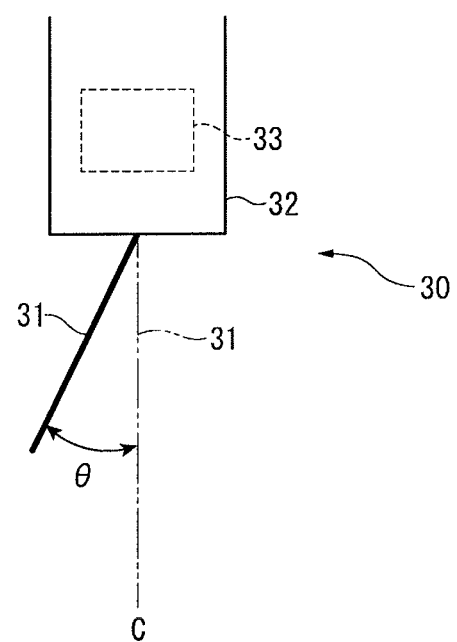
FIG. 3 illustrates a detecting device main body and a stylus of the roundness measurement device.

As shown in an expanded view in FIG. 3, the detecting device 30 includes a stylus 31 contacting the measured object W, a detecting device main body (detector main body) 32 which rotatably and attachably/detachably supports the stylus 31, and an angle position detector switch 33 as a standard position acquirer. A standard axis C is an imaginary line which matches the axis of the detecting device main body 32 and is used as a relative standard for expressing an angle position of the stylus 31. Hereafter, an angle between the stylus 31 and the standard axis C is called an angle position θ.

When an external force is applied, the stylus 31 rotates within a predetermined rotation range with respect to the detecting device main body 32 in a direction along an X-Z plane. The stylus 31 does not rotate in any other direction.

In the present embodiment, the predetermined rotation range is a range where the angle position θ is between 0° and 15°, for example. In the present embodiment, the angle position θ=15° is an original position of the stylus 31. In other words, the angle position θ of the stylus 31 is 15° at a start and a completion of the measurement. The angle position detector switch 33 outputs a detection signal expressing the angle position to the control mechanism 60 when the angle position θ of the stylus 31 with respect to the standard axis C is 0° and 15°.

To rotate the stylus 31, a configuration includes a requirement of an external force equal to or greater than a predetermined size. Therefore, the stylus 31 does not rotate simply due to vibration from the rotation table 20 and the detection driving mechanism 40 displacing the detecting device 30. A method to rotate the stylus 31 is described below.

The detecting device driving mechanism 40 includes a column 41, a lift driving mechanism 43, a first slide driving mechanism 45, a second slide driving mechanism 46, and a swivel driving mechanism 47. The column 41 is provided upright on the other side of the base 10 (right side in FIG. 2). The lift driving mechanism 43 drives, with respect to the column 41, a lifting slider 42 in an up/down direction (Z axis direction). The first slide driving mechanism 45 drives a slide arm 44, with respect to the lifting slider 42, in a direction orthogonal to the vertical axis L as well as in a direction approaching/separating with respect to the rotation table 20 (X axis direction). The second slide driving mechanism 46 is provided on a forefront end of the slide arm 44 and slides the detecting device 30 in a direction orthogonal with respect to a slide axis of the slide arm 44. The swivel driving mechanism 47 rotates the second slide driving mechanism 46 centered on the slide axis of the slide arm 44.

The lift driving mechanism 43 may be configured in any way as long as the lifting slider 42 is capable of driving in the up/down direction. Although not shown in the drawings, for example, a feeding mechanism may be used that includes a ball screw shaft provided upright on the column 41 in the up/down direction, a motor to rotate the ball screw shaft, and a nut member screwed onto the ball screw shaft and connected to the lifting slider 42. The first slide driving mechanism 45 may also be configured in any way as long as the slide arm 44 is capable of driving in a direction orthogonal with respect to the vertical axis L and in a direction approaching/separating with respect to the rotation table 20. Although not shown in the drawings, for example, a configuration having a rack formed along a length direction of the slide arm 44 and providing a pinion meshing with the rack and a motor rotating the pinion within the lifting slider 42.

Figure 4:
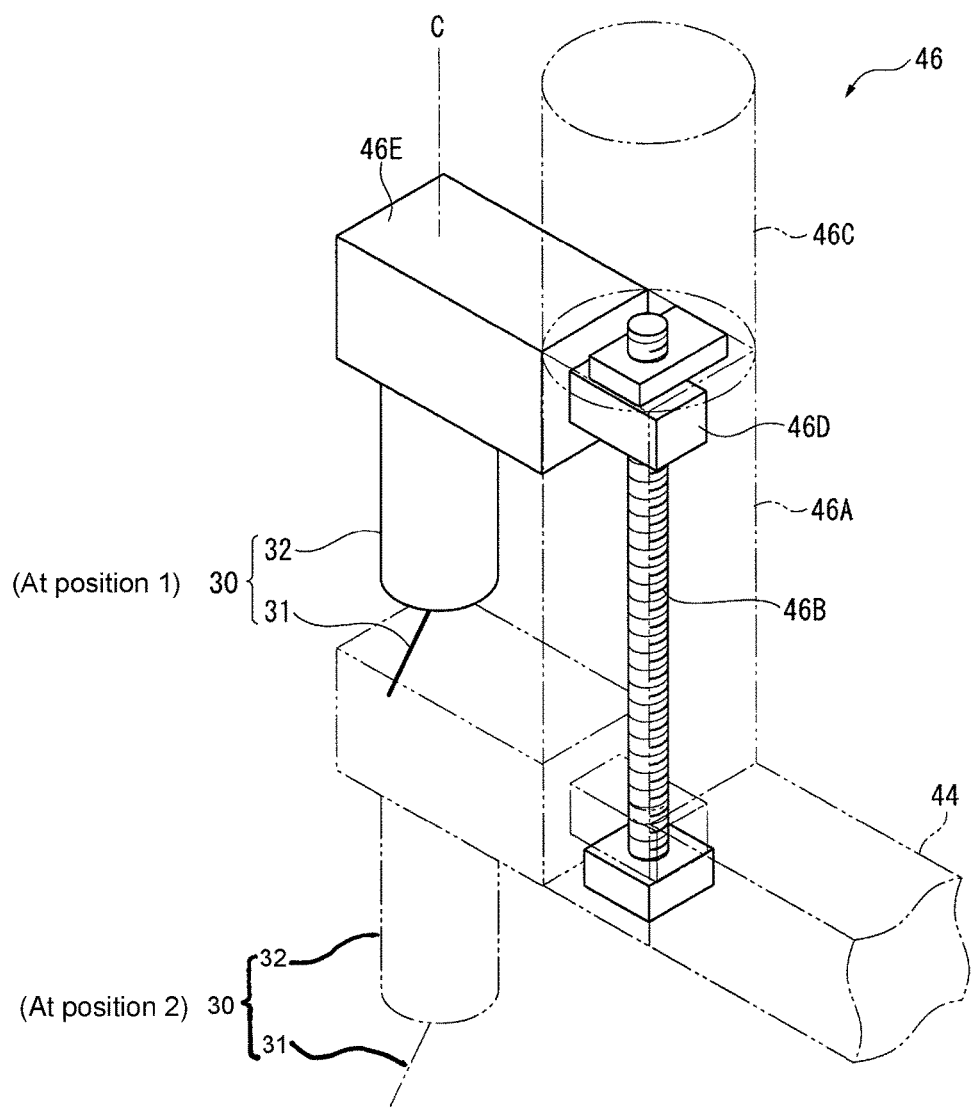
FIG. 4 is a perspective view illustrating a second slide driving mechanism of the roundness measurement device.

As shown in FIG. 4, the second slide driving mechanism 46 has a feeding mechanism that includes a case member 46A attached at a right angle to the forefront end of the slide arm 44, a ball screw shaft 46B rotatably provided within the case member 46A, a motor 46C rotating the ball screw shaft 46B, a nut member 46D screwed onto the ball screw shaft 46B, and a detecting device holder 46E that includes the nut member 46D and holds the detecting device 30. Moreover, the second slide driving mechanism 46 is not limited to the configuration of FIG. 4.

Figure 5:
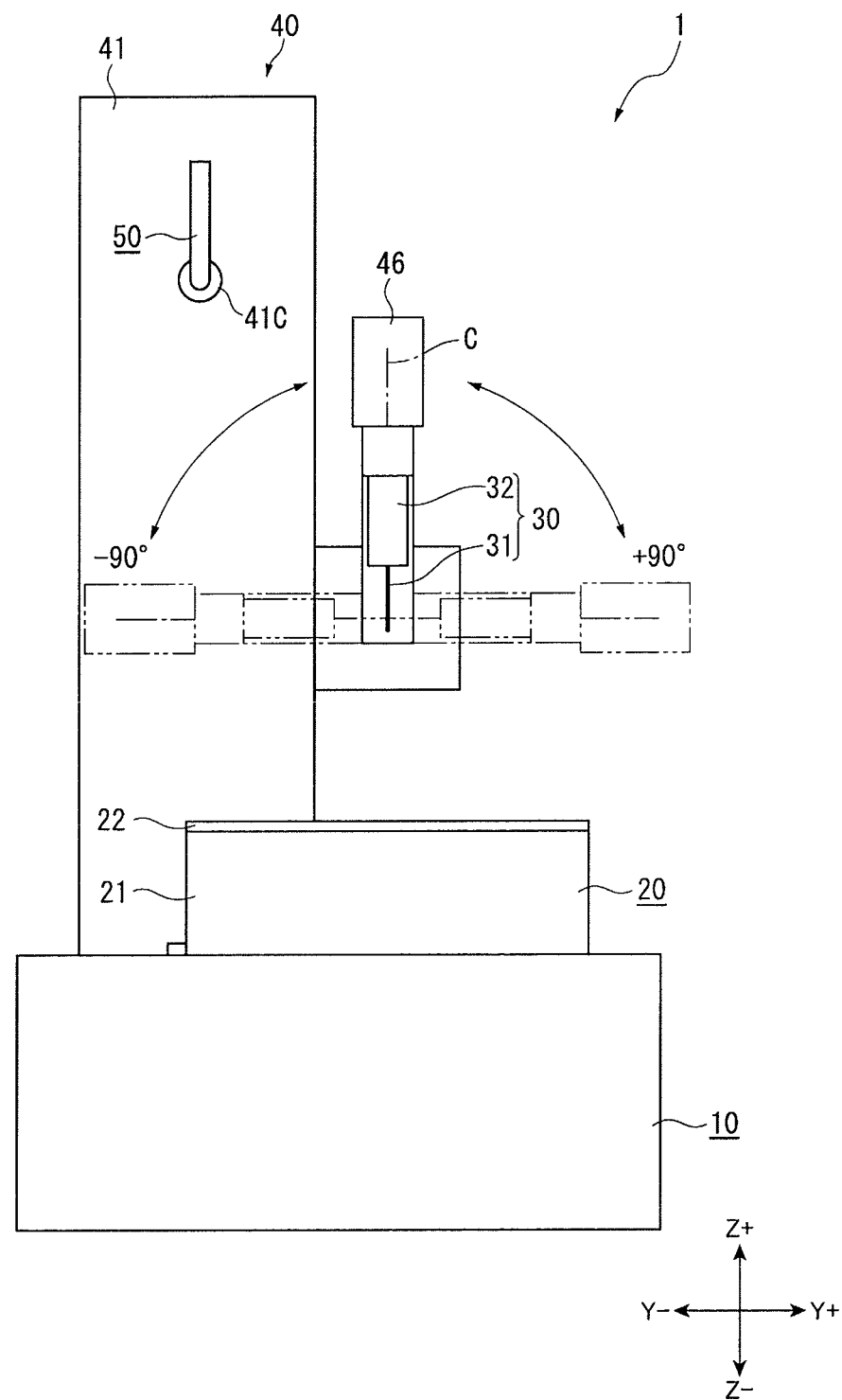
FIG. 5 is a side view illustrating operations of a swivel driving mechanism of the roundness measurement device.

The swivel driving mechanism 47 is, for example, configured with a swivel shaft (not shown in the drawings) rotatably provided within the slide arm 44 and having a forefront end connected to the case member 46A of the second slide driving mechanism 46, and a motor 47B provided on a base end of the swivel shaft and swivel driving the swivel shaft. In the present embodiment, when viewed from an X direction shown in FIG. 5, a posture of the detecting device 30 where the stylus 31 extends in the up/down direction is set to 0°, and the posture of the detecting device 30 is configured to be changeable within a range of −90° to +90°.

The contact member 50 is formed in a hook shape and includes a horizontal portion 50A extending horizontally and a vertical portion 50B extending vertically from an edge of the horizontal portion 50A. The contact member 50 is used to rotate the stylus 31 by making contact with the stylus 31. The contact member 50 is formed by a metal having rigidly (such as iron). Moreover, a surface of the contact member 50 may be covered with a thin cushioning material (such as rubber). With the cushioning material, durability of the stylus 31 and the contact member 50 can be improved. As shown in FIG. 2, a hole 41A is formed on a top end and a hole 41B is formed on a bottom end, respectively, of a surface of the column 41 facing the rotation table 20. Round annular bosses 41C and 41D are respectively attached at a position corresponding to the holes 41A and 41B, the bosses 41C and 41D each having a screw hole passing through in a radial direction. In the present embodiment, to make the vertical portion 50B face up, a forefront end of the horizontal portion 50A is inserted through the hole 41A and the contact member 50 is fixated by a threaded screw to the boss 41C.

Figure 6:
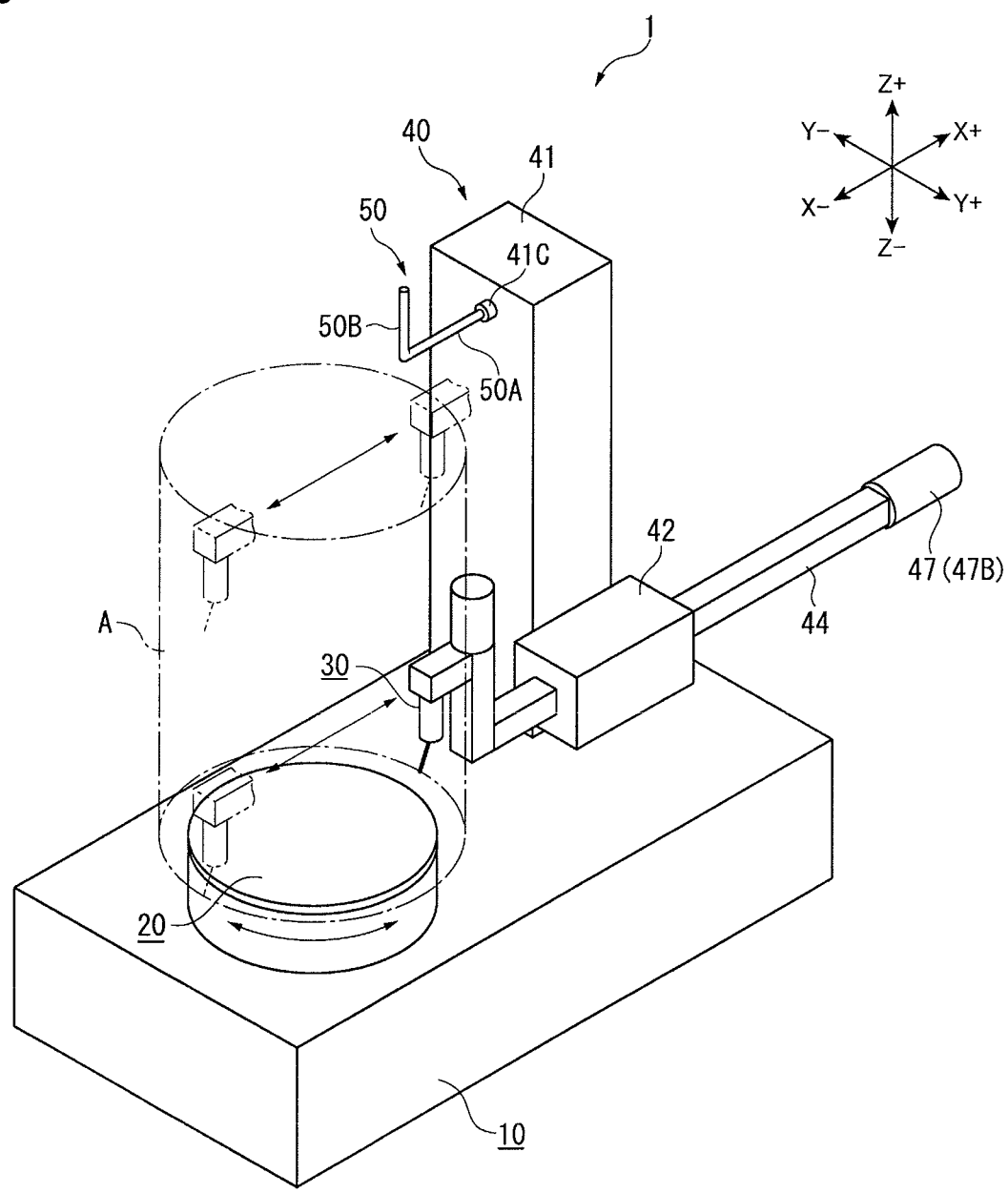
FIG. 6 is a perspective view illustrating a measurement region of the roundness measurement device.

Moreover, as indicated by dashed lines in FIG. 2, the contact member 50 can also be inserted through the hole 41B and be fixated such that the vertical portion 50B faces down. The forefront end of the horizontal portion 50A and holes 41A and 41B may be subjected to key machining or spline machining such that the vertical portion 50B faces a predetermined direction (for example, 0°, 90°, 180°, and 270°). The contact member 50 is preferably provided outside of a measured region A (boundary range indicated by double dashed lines in FIG. 6), which is determined by a displacement range of the rotation table 20 and the detecting device driving mechanism 40. The previously described second slide driving mechanism 46 and the swivel driving mechanism 47 are configured so as to be capable of displacing the stylus 31 to the contact member 50 to make contact.

The displacement range of the stylus 31 differs based on types of the measured object W and the displacement range of the stylus 31 can be determined by a measurement program even for the same measured object W. Specifically, even in a case where the contact member 50 is inside the measurement region A, the contact member 50 does not immediately become an obstacle for the measurement. Therefore, subject to presenting no obstacle to measurement, the contact member 50 can be provided inside the measurement region A.

Description of Control System

Figure 7:
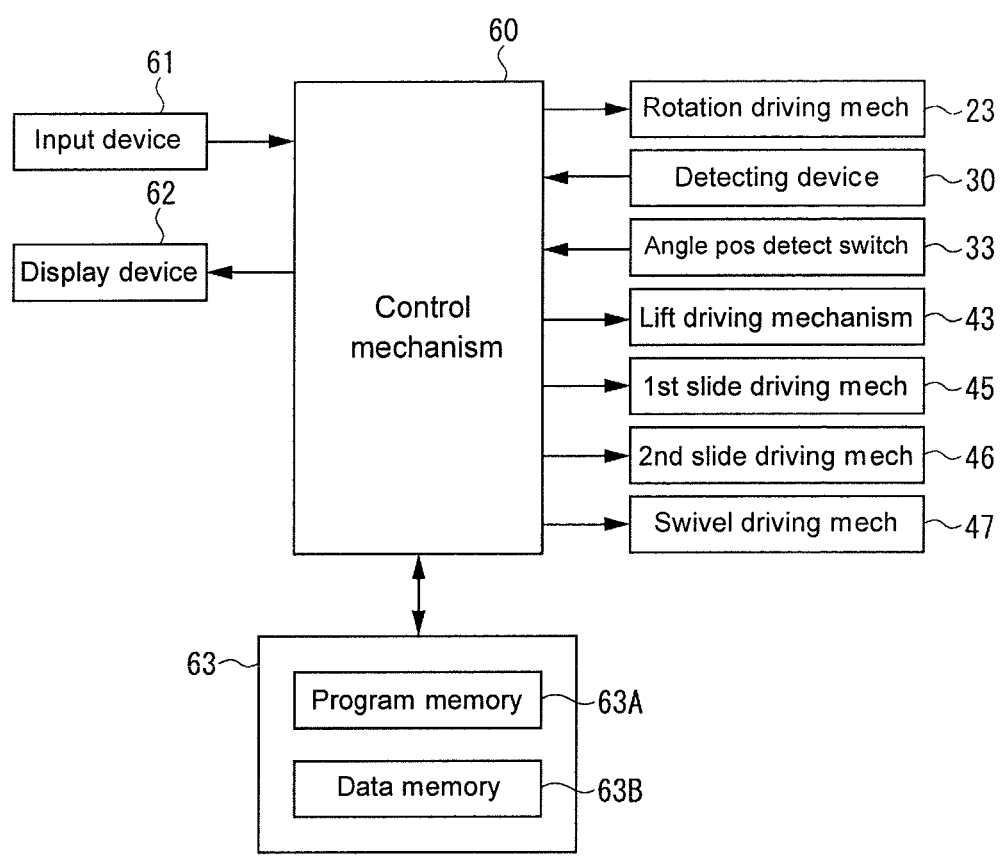
FIG. 7 is a block diagram illustrating a control mechanism of the roundness measurement device and peripheral mechanisms.

As shown in FIG. 7, a main control system includes the control mechanism 60, an input device 61, a display device 62, and a memory device 63. The memory device 63 is provided with a program memory 63A, a data memory 63B, and the like. The program memory 63A stores a measurement program, an angle position change program, and the like. The data memory 63B stores measurement data captured at the time of measurement and the like.

Besides the input device 61, the display device 62, and the memory device 63, the control mechanism 60 is also connected to, for example, the rotation driving mechanism 23, the lift driving mechanism 43, the first slide driving mechanism 45, the second slide driving mechanism 46, the swivel driving mechanism 47, the detecting device 30, and the angle position detector switch 33. Based on the measurement program and the angle position change program stored in the program memory 63A, the control mechanism 60 controls driving of each mechanism as a driving controller and includes capturing and processing a detection signal from the detecting device 30. Specifically, when a measurement command is given, the measurement of the roundness and the like of the measured object W is performed while controlling the movement of the rotation driving mechanism 23 and the detection driving mechanism 40.

Description of Measurement Movement

Measurement positions of various measured objects W, measurement procedures, analysis items, and the like are stored in advance in the memory device 63. When the type of the measured object W is specified by an input from the input device 61, the type of the measured object W is sent to the program memory 63A and the program memory 63A calls up the measurement program corresponding to the measured object W. When the measurement command is given to the control mechanism 60 by the measurement program, the rotation table 20 is rotationally driven and the detection device driving mechanism 40 is driven. Specifically, with an activation of the lift driving mechanism 43 and the first slide driving mechanism 45 (and the swivel driving mechanism 47 if necessary), the detecting device 30 displaces in a direction approaching the measured object W and the stylus 31 of the detecting device 30 contacts the rotating measured object W.

The stylus 31 displaces, then the displacement of the stylus 31 is transmitted to the detecting device main body 32 and the detecting device main body 32 outputs a continuous signal expressing the displacement of the stylus 31 to the control mechanism 60. After the data memory 63B stores inputted signals as data, the control mechanism 60 calculates the roundness based on the stored data and displays the result on the display device 62. The roundness measurement of the measured object W is performed at various portions while displacing the detecting device 30 in a Z direction by driving the second slide driving mechanism 46.

Figure 8A:
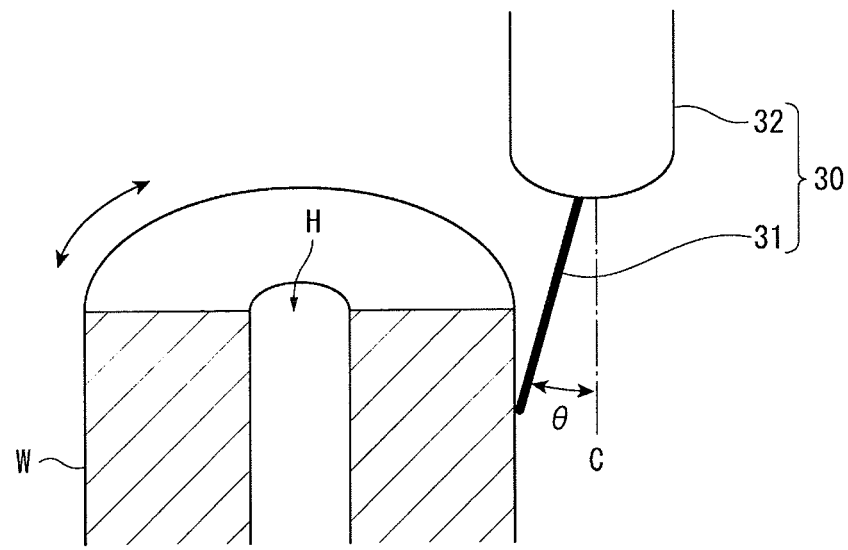
FIGS. 8A and 8B are cross-sectional views of measuring states in the roundness measurement device.
Figure 8B:
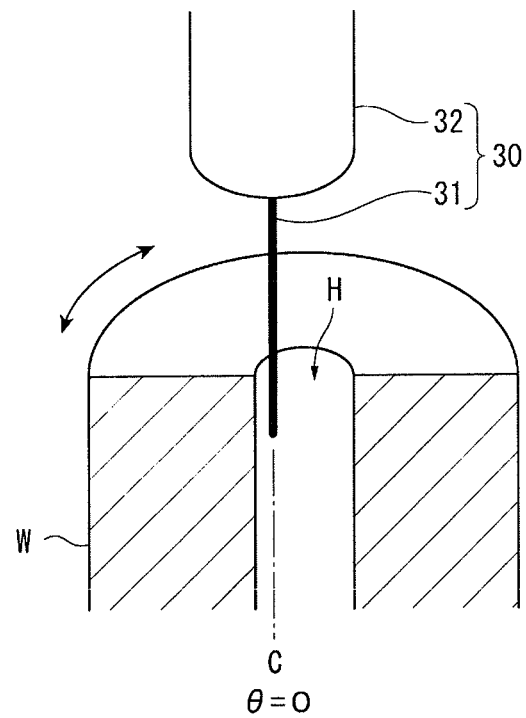

In this example, the measurement surface of the measured object W can be an outer circumferential surface (axis) and an inner circumferential surface (hole). As shown in FIG. 8A, when measuring the roundness of the measured object W where the outer circumferential surface is a long vertical plane, the angle position θ of the stylus 31 is maintained at the original position of 15° to avoid the detecting device main body 32 interfering with the measured object. Meanwhile, when measuring the roundness of a small diameter hole H extending in an axis direction and formed in the center of the measured object W, the angle position change program is executed. As shown in FIG. 8B, the angle position θ of the stylus 31 is changed to 0° to avoid the stylus 1 and the detecting device main body 32 interfering with an edge of the hole H.

Description of Method of Changing Angle Position θ of Stylus 31

A method of changing the angle position θ of the stylus 31 is described with reference to FIGS. 9A and 9B. Hereafter, an exemplary case is described in which the roundness measurement of the measured object W is performed on the outer circumferential surface and the inner circumferential surface in that order. After completion of the roundness measurement of the outer circumferential surface of the measured object W, the program memory 63A calls the angle position change program. By driving the first slide driving mechanism 45 with the angle position change program, the stylus 31 is separated from the measured object W in the X+ direction. Next, by driving the swivel driving mechanism 47, an attitude of the detecting device 30 is tilted by +90° (see FIG. 5). When the attitude of the detecting device 30 is tilted by +90° like this, the detecting device 30 can be displaced in a Y direction by driving the second slide driving mechanism 46. Thus, the detecting device 30 is capable of moving in the X direction by driving the first slide driving mechanism 45, in the Y direction by driving the second slide driving mechanism 46, and in the Z direction by driving the lift driving mechanism 43.

Figure 9A:
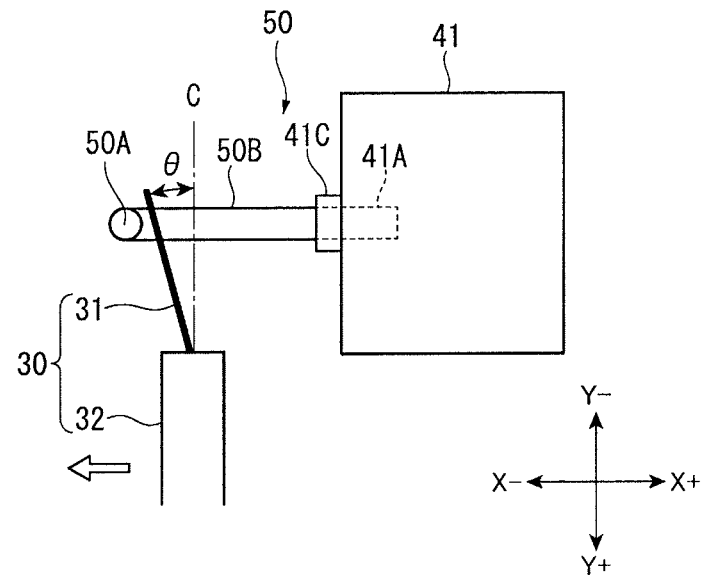
FIGS. 9A and 9B are explanatory drawings of a method to switch angle positions of the stylus.
Figure 9B:
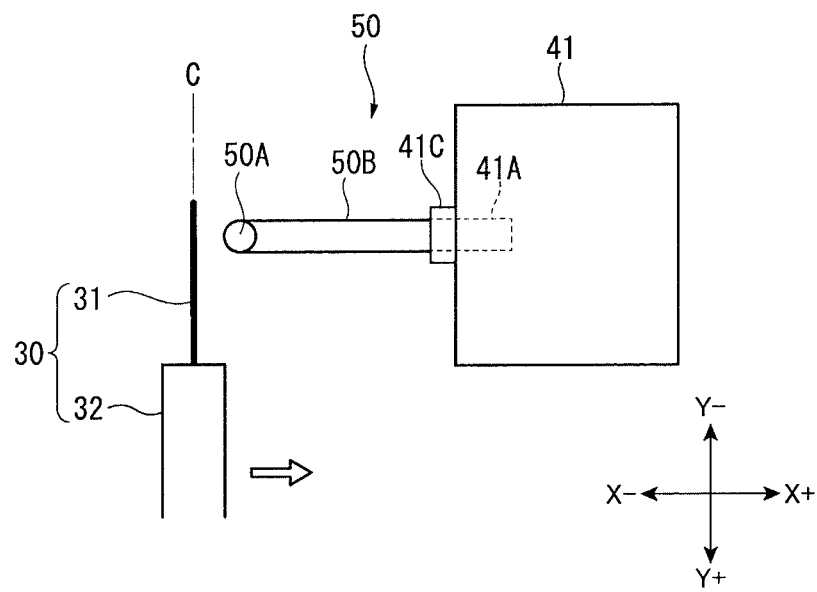

Next, by driving the lift driving mechanism 43, the first slide driving mechanism 45, and the second slide driving mechanism 46, the stylus 31 is displaced to a position between the column 41 and the vertical portion 50B of the contact member 50 (a position shown in FIG. 9A). Then, when the detecting device 30 is displaced in the X− direction (direction shown with an arrow in FIG. 9A) from this position by driving the first slide driving mechanism 45, the stylus 31 makes contact with the contact member 50 and rotates. When the angle position θ of the stylus 31 with respect to the detecting device main body 32 becomes 0° the minimum, the first slide driving mechanism 45 stops in response to a detection signal expressing this state that is output to the control mechanism 60 from the angle position detector switch 33. Then, the detecting device 30 is returned to an attitude prior to the tilt of +90° (0° attitude in FIG. 5), for example, by driving each driving mechanism and the stylus 31 is inserted through the hole H of the measured object W as shown in FIG. 8B, after which the roundness measurement of the inner circumferential surface starts.

After completing all the roundness measurements of the outer circumferential surface and the inner circumferential surface, the stylus 31 is displaced to the X− side of the contact member 50 (position shown in FIG. 9B) by driving each driving mechanism. Then, from this position, when the stylus 31 displaces in the X+ direction (direction shown with an arrow in FIG. 9B) by driving the first slide driving mechanism 45, the stylus 31 makes contact with the contact member 50 and rotates. When the angle position θ of the stylus with respect to the detecting device main body 32 becomes 15° the maximum, the first slide driving mechanism 45 stops in response to a detection signal expressing this state that is output to the control mechanism 60 from the angle position detector switch 33. Then, by driving each driving mechanism, each driving mechanism is returned to the original position and a series of roundness measurements is completed As noted above, the stylus 31 capable of changing the angle position θ with respect to the detecting device main body 32 using the external force and the contact member 50 capable of making contact with the stylus 31 are provided in the present embodiment. Therefore, the angle position θ of the stylus 31 with respect to the detecting device main body 32 can be changed by the stylus 31 making contact with the contact member 50. In other words, the angle position θ of the stylus 31 can be automatically switched between 15° and 0° using driving power of the displacement mechanism. Therefore, during a series of measuring operations, the angle position θ of the stylus 31 can be changed without interrupting the automatic operation. In addition, the displacement mechanism is a mechanism originally provided to the roundness measurement device 1 for measuring, such that there is no need to provide another mechanism only for driving the stylus 31. Thereby, costs and weight can be reduced and measurement accuracy can be maintained by avoiding an influence of thermal expansion since the number of motors which are a source of heat generation is not increased.

Because the angle position θ of the stylus 31 is obtained by the angle position detector switch 33, switching the angle position θ of the stylus 31 can be performed certainly and excessive external force can be avoided at the time the stylus 31 makes contact.

Since the contact member 50 is formed in a projecting shape with respect to the column 41, the stylus 31 is displaced to be in front of the contact member 50 and is made to continue on the path to the contact member 50. Therefore, changing the angle position θ of the stylus 31 can be performed easily.

The contact member 50 is bolted to the column 41 and can be replaced as a single body. Even when the contact member 50 is damaged by repeated contact with the stylus 31, only the contact member 50 needs to be replaced, so maintenance cost can be reduced. In addition, the contact member 50 is covered with the cushioning material, so damage to the stylus 31 at the time of contact is low. Accordingly, a replacement cycle of the stylus 31 can be extended.

Description of Contact Member 150 in Modified Example

Figure 10:
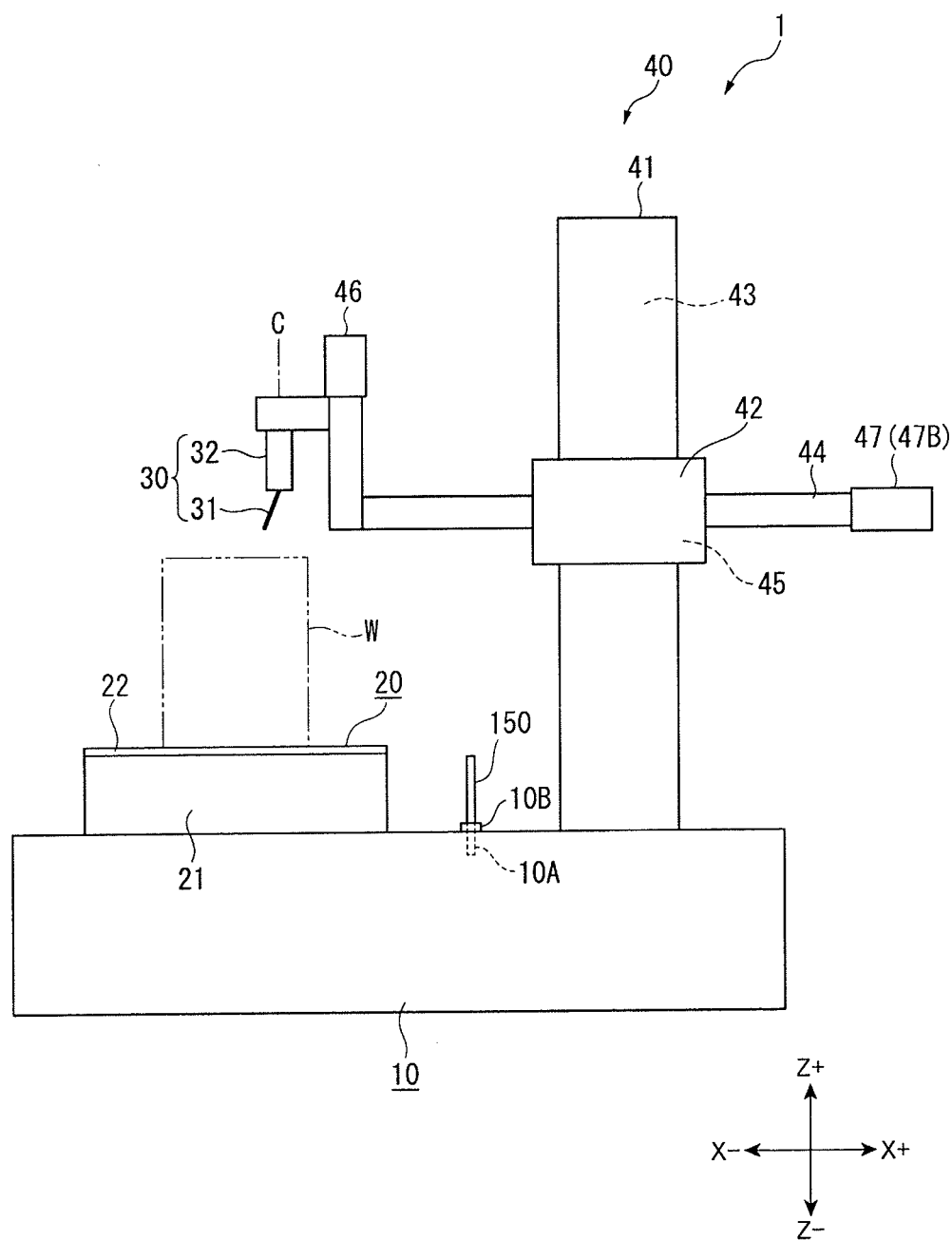
FIG. 10 is a side view of the roundness measurement device which includes a modified example of a contact member.

FIG. 10 is a side view of the roundness measurement device 1 provided with a modified example of a contact member 150. The configuration in FIG. 10 is exactly the same as in the previously mentioned embodiment except for the contact member 150, and therefore, except for the contact member 150, identical reference numerals are used for structures similar to those in the previously mentioned embodiment and a description thereof is omitted. The contact member 150 is a stick-like member extending vertically and is fixated to a boss 10B by a threaded screw by inserting a bottom end through a hole 10A formed on the base 10 extending in the up/down direction. In addition, the surface of the contact member 150, similar to the contact member 50 in the previously mentioned embodiment, can be covered with a thin cushioning material (such as rubber). Changing of the angle position θ of the stylus 31 using the contact member 150 can also be performed in a manner basically similar to the previously mentioned embodiment. According to the roundness measurement device 1 in the modified example, the contact member 150 is fixated to the top surface of the base 10; therefore, changing the angle position θ of the stylus 31 can be performed without displacing the lift slider 42 significantly upward even in a case where the height of the measured object W is low.

In a case where the contact member 150 is arranged in a position overlapping with the slide arm 44 in the Z direction, changing the angle position θ of the stylus 31 can be performed in a state where the attitude of the detecting device 30 is 0° without driving the swivel driving mechanism 47. In this case, to make the downward-oriented stylus 31 accurately contact the contact member 150, the contact member 150 can be preferably formed in a shape having a lateral width (Y direction) such as a block shape, a U shape, and an L shape, for example.

The present invention is not limited to the previously mentioned embodiment and modified example, and includes modifications and improvements with a scope capable of achieving the advantages of the present invention. For example, in the previously mentioned embodiment, although the stylus 31 of the detecting device 30 oriented horizontally (+90° of attitude indicated by double dashed lines in FIG. 5) contacts the vertical portion 50B of the contact member 50, the stylus 31 of the detecting device 30 oriented vertically (attitude indicated by a solid line in FIG. 5) may make contact with a contact member by providing the contact member extending horizontally (Y direction). In such a case, the contact member 50 is provided at a position lower than the lift slider 42.

In the previously mentioned embodiment, although the contact member 50 is formed in the stick shape, as long as the shape is capable of accurately making contact, a spherical shape or a block shape may be used, for example. Furthermore, the contact member 50 does not need to be formed in the projecting shape and may be formed with an indentation, for example and rotated by hooking the stylus 31 to the indentation. A plurality of indentations can be provided.

The contact member 50 can be provided making contact with the stylus 31, such as outside the base 10, for example. However, a position not interfering with the measurement is preferable. In the previously mentioned embodiment, one contact member 50 was selectively mounted to the hole 41A or the hole 41B formed on the column 41, however, the contact member can be mounted to both at the holes 41A and 41B. In addition, the contact member 50 can be non-detachably/attachably fixated to the holes 41A and 41B.

In the previously mentioned embodiment, the stylus 31 is configured so as to rotate only in a direction along the X-Y plane; however, the stylus 31 can also be configured so as to rotate in another direction or in all directions. Even in a case where the stylus 31 rotates in all directions, as long as the contact direction is constant, the rotation direction also becomes constant.

In the previously mentioned embodiment, the angle position detector switch 33 used as the angle position acquirer is a type that outputs the detection signal when the angle position θ is 0° and 15°; however, the angle position acquirer may also be a type that outputs a continuous detection signal expressing the angle position θ using variable resistance in which a resistance value varies in response to the angle position θ, for example. By counting the amount of displacement of the slide arm 44 by the first slide driving mechanism 45 when switching the angle position θ, an amount of change in the angle position θ, may be calculated on a feed-forward basis based on the count value. In addition, by capturing an image of the stylus 31 with a camera when switching the angle position θ, the angle position θ of the stylus 31 may be calculated based on the image data. In other words, obtaining the angle position θ of the stylus 31 may be performed remotely using light or a signal.

In the previously mentioned embodiment, a case of measuring the roundness of the measured object W was shown in the order of the outer circumferential surface and the inner circumferential surface. However, the present invention is not limited to this, and roundness may be measured in the order of the inner circumferential surface and the outer circumferential surface. In addition, the present invention can be applied to not only a case of continuous measurement of the roundness of the outer/inner circumferential surface, but also to any case where the angle position of the stylus 31 is to be changed for measurement. Furthermore, when starting or shutting down the device, the stylus 31 can be set in the predetermined angle position (initial position) by applying the present invention as needed. Moreover, in the previously mentioned embodiment, the angle position θ of the stylus 31 to be used during measurement was 0° and 15°; however, three or more angle positions θ may be used for measurement.

Industial Applicability of Invention

The present invention can be used with a roundness measurement device measuring roundness of both outer and inner circumferential surfaces of a measured object with one measurement.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A roundness measurement device having a rotation table on a base and configured to measure roundness of a measured object placed on the rotation table while rotating the rotation table, the roundness measurement device comprising:
    a detector main body;
    a displacer configured to displace the detector main body with respect to the base;
    a stylus having a base end rotatably supported on the detector main body and configured to change an angle position with respect to the detector main body using an external force;
    a contacter provided at a position so as to be contactable with the stylus due to displacement of the detector main body by the displacer; and
    a driving controller configured to control driving of the displacer,
    wherein
    the displacer is further configured to displace the stylus to be proximate to the contacter and to bring the stylus into contact with the contacter, and
    the stylus is further configured to rotate the stylus to a predetermined angle with respect to the detector main body.

2. The roundness measurement device according to claim 1, further comprising an angle position acquirer configured to obtain the angle position of the stylus.

3. The roundness measurement device according to claim 2, wherein the contacter has a projecting shape with respect to an installation surface.

4. The roundness measurement device according to claim 3, wherein the contacter is detachably and attachably provided.

5. The roundness measurement device according to claim 4, wherein the contacter is selectively mountable to one of a plurality of positions.

6. The roundness measurement device according to claim 5, wherein the contacter is covered with a cushioning material.

7. The roundness measurement device according to claim 4, wherein the contacter is covered with a cushioning material.

8. The roundness measurement device according to claim 3, wherein the contacter is covered with a cushioning material.

9. The roundness measurement device according to claim 2, wherein the contacter is covered with a cushioning material.

10. The roundness measurement device according to claim 1, wherein the contacter has a projecting shape with respect to an installation surface.

11. The roundness measurement device according to claim 10, wherein the contacter is detachably and attachably provided.

12. The roundness measurement device according to claim 11, wherein the contacter is selectively mountable to one of a plurality of positions.

13. The roundness measurement device according to claim 12, wherein the contacter is covered with a cushioning material.

14. The roundness measurement device according to claim 11, wherein the contacter is covered with a cushioning material.

15. The roundness measurement device according to claim 10, wherein the contacter is covered with a cushioning material.

16. The roundness measurement device according to claim 1, wherein the contacter is covered with a cushioning material.

17. A method for controlling a roundness measurement device providing a rotation table on a base and measuring roundness of a measured object placed on the rotation table while rotating the rotation table wherein the method utilizes a roundness measurement device, the roundness measurement device including a detector main body; a displacer configured to displace the detector main body with respect to the base; a stylus having a base end rotatably supported on the detector main body and configured to change an angle position with respect to the detector main body using an external force; a contacter provided at a position so as to be contactable with the stylus due to displacement of the detector main body by the displacer; and a driving controller configured to control driving of the displacer, the method comprising:

displacing the stylus to be proximate to the contacter;

bringing the stylus into contact with the contacter; and rotating the stylus to a predetermined angle with respect to the detector main body.

\* \* \* \* \*